United States Patent
Babbar et al.

(10) Patent No.: US 7,212,810 B2
(45) Date of Patent: May 1, 2007

(54) SYSTEM SELECTION FOR WIRELESS DATA SERVICES

(75) Inventors: Uppinder Babbar, San Diego, CA (US); Nikolai K. N. Leung, Takoma Park, MD (US); Marcello Lioy, San Diego, CA (US); Siva Veerepalli, San Diego, CA (US); Anup Kuzhiyil, San Diego, CA (US); James J. Willkie, Poway, CA (US); Jeffrey A. Dyck, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 10/816,314

(22) Filed: Apr. 1, 2004

(65) Prior Publication Data

US 2005/0083899 A1    Apr. 21, 2005

Related U.S. Application Data

(60) Provisional application No. 60/512,324, filed on Oct. 17, 2003.

(51) Int. Cl.
*H04Q 7/22* (2006.01)
*H04Q 7/20* (2006.01)
*H04M 3/42* (2006.01)

(52) U.S. Cl. .................. 455/414.1; 455/434; 455/445; 455/557; 370/342

(58) Field of Classification Search ............. 455/151.1, 455/151.4, 411, 436, 557, 432, 434, 445, 455/551, 558, 414.1; 370/342, 259, 351
See application file for complete search history.

(56) References Cited

U.S. PATENT DOCUMENTS

| | | | | |
|---|---|---|---|---|
| 5,794,142 | A * | 8/1998 | Vanttila et al. | 455/419 |
| 6,317,597 | B1 * | 11/2001 | Baker et al. | 455/426.1 |
| 6,370,374 | B1 * | 4/2002 | Eichinger et al. | 455/411 |
| 6,983,311 | B1 * | 1/2006 | Haitsuka et al. | 709/217 |
| 2002/0039892 | A1 | 4/2002 | Lindell | 455/151.1 |

FOREIGN PATENT DOCUMENTS

| | | |
|---|---|---|
| EP | 0781064 | 6/1997 |
| WO | 03073782 | 9/2003 |

* cited by examiner

*Primary Examiner*—Tony T. Nguyen
(74) *Attorney, Agent, or Firm*—Thomas Rouse; Charles D. Brown; Howard H. Seo

(57) ABSTRACT

Techniques for performing system selection based on a usage model that uses "access strings", "profiles", and "activation strings" are described. Access strings are defined for wireless data services and provide a highly intuitive user interface. Each access string is associated with one or more profiles. Each profile includes various parameters needed to establish a specific data call. Each profile is further associated with an activation string that contains connection information for the data call. System selection is performed in two parts. In the first part, a wireless user views access strings for available data services, selects the access string for the desired data service, and returns the selected access string. In the second part, the wireless device selects a profile for a system most suited to provide the desired data service, from among all profiles associated with the selected access string.

30 Claims, 6 Drawing Sheets

SYSTEM SELECTION FOR WIRELESS DATA SERVICES

This application claims the benefit of provisional U.S. application Ser. No. 60/512,324, entitled "Method to Facilitate Robust System Selection to Serve a Wireless Data User in a Multimode Environment" filed Oct. 17, 2003.

BACKGROUND

I. Field

The present invention relates generally to data communication, and more specifically to techniques for selecting a suitable communication system to obtain wireless data services.

II. Background

Wireless communication networks are widely deployed to provide various communication services such as voice, data, and so on. These wireless networks may be capable of supporting multiple users by sharing the available resources and may be based on Code Division Multiple Access (CDMA), Time Division Multiple Access (TDMA), Frequency Division Multiple Access (FDMA), or some other multiple-access techniques. A CDMA-based network may implement one or more standards such as Wideband-CDMA (W-CDMA), IS-2000 Releases 0 and A (commonly referred to as CDMA 1x), IS-856 (commonly referred to as CDMA 1x EV-DO), IS-2000 Release C (commonly referred to as CDMA 1x EV-DV), IS-95, and so on. (As used herein, "IS-2000" includes all releases of this standard.) A TDMA-based network may implement one or more standards such as Global System for Mobile Communications (GSM). W-CDMA, CDMA 1x, CDMA 1x EV-DO, and CDMA 1x EV-DV are third generation standards for CDMA, and IS-95 and GSM are second generation standards for CDMA and TDMA, respectively. A GSM network may implement General Packet Radio Service (GPRS) or Enhanced Data rates for Global Evolution (EDGE) for packet data transmission.

CDMA 1x, CDMA 1x EV-DO, CDMA 1x EV-DV, IS-95, W-CDMA, GSM/GPRS, and GSM/EDGE may be viewed as different "wireless network" technologies. Each wireless network technology corresponds to a different combination of (1) a radio access technology for over-the-air communication and (2) a data network technology for packet data transmission. The data network technologies are not explicitly identified for some of the wireless network technologies noted above. For simplicity, the following description, a CDMA family of standards/technologies includes CDMA 1x, CDMA 1x EV-DO, CDMA 1x EV-DV, IS-95, and other standards adopted by a consortium named "3rd Generation Partnership Project 2" (3GPP2). A Universal Mobile Telecommunications System (UMTS) family of standards/technologies includes W-CDMA, GSM/GPRS, GSM/EDGE, and other standards adopted by a consortium named "3rd Generation Partnership Project" (3GPP).

Wireless communication networks of various wireless network technologies are widely deployed throughout the world by network operators (which may also be called service providers or wireless carriers). Each service provider may support a wide spectrum of wireless data services via its deployed networks. Such data services may include Internet connectivity, WAP (Wireless Application Protocol) access, multimedia streaming, multimedia messaging, instant messaging, and so on. Each service provider may support different data services at different locations and may further provide these data services using different wireless network technologies. For example, a service provider may provide Internet connectivity in Europe using GPRS and Internet access in the United States using CDMA 1x EV-DO. This same service provider may also provide Short Message Service (SMS) and Instant Messaging Service (IMS) only in the United States and not in Europe. A service provider may also deploy multiple wireless networks of different wireless network technologies (e.g., CDMA 1x and CDMA 1x EV-DO) in the same area to provide the same or different data services. Thus, at any given location, one or more wireless networks of the same or different wireless network technologies operated by one or more service providers may be available to provide a multitude of wireless data services.

A wireless multi-mode device (e.g., a dual-mode cellular phone) may be capable of communicating with wireless networks of different wireless network technologies (e.g., CDMA 1x, CDMA 1x EV-DO, W-CDMA, GSM/GPRS, GSM/EDGE, and so on) to obtain wireless data services. This capability allows a wireless user/subscriber to obtain data services from more wireless networks and to extend coverage with the same device. For example, the wireless user using the multi-mode device may roam through wireless networks of different service providers. At any given moment and location, the multi-mode device may be within the coverage area of one or more wireless networks of the same or different wireless network technologies and operated by one or more service providers. Each wireless network may provide a respective set of data services. Depending on the location of the multi-mode device and the service subscriptions, the wireless user may have many choices in terms of which wireless networks may be used to obtain the desired data services.

Conventionally, a wireless device may be provisioned or pre-configured with one or more "contexts" (for the UMTS family) or "dial strings" (for the CDMA family), which may be activated to obtain wireless data services. CDMA-based devices can use different means to convey what services are required. For simplicity, the use of dial strings to specify services is described below for a CDMA-based device. The contexts or dial strings are typically provisioned on the wireless device by a specific service provider for a specific wireless network technology and are thus implicitly or explicitly associated with the service provider and technology. Each context/dial string includes pertinent information needed to establish (i.e., activate or set up) a data call for a specific data service via a wireless network operated by the service provider. To obtain a desired data service, the wireless user would normally need to either (1) browse through a list of contexts/dial strings provisioned on the wireless device and select a suitable context/dial string for the desired data service or (2) specify a context/dial string. The wireless user would then activate the selected context/dial string to establish data connectivity.

The conventional usage model described above, wherein the wireless user selects an appropriate context/dial string for a combination of data service, wireless network technology, and service provider, places most of the decision burden on the wireless user. This usage model is suitable for a simple case in which a limited number of choices for contexts/dial strings are provisioned on the wireless device. However, a wireless multi-mode device may be designed with the capability to communicate with wireless networks of different technologies to obtain a multitude of data services. The conventional usage model would not be well suited for such a multi-mode device. This is because the conventional usage model requires the wireless user to be aware of: (1) the various types of wireless networks that are accessible at any given time and location, (2) the data services that are available from each wireless network, and (3) the data service each context/dial string is capable of providing. All of this can complicate data usage for the wireless user.

There is therefore a need in the art for techniques to more easily select wireless networks to obtain desired data services.

SUMMARY

Techniques for performing system selection to obtain wireless data services via a wireless device are described herein. As used herein, "system selection" refers to the selection of a suitable system to obtain a data service desired by a wireless user using a wireless device. In the context of system selection, a "system" refers to a particular wireless network technology provided by a particular service provider, i.e., a specific Technology and Provider pair. System selection is thus defined by three parameters—Service, Technology, and Provider.

The system selection techniques described herein are based on an innovative usage model that uses "access strings", "profiles", and "activation strings". Access strings are defined for wireless data services and provide a highly intuitive user interface for the wireless user. Each access string is associated with one or more profiles. Each profile includes various types of information or parameters (e.g., subscriber information, security information, service option, quality of service (QoS), and so on) needed to establish a specific data call. Each profile is further associated with an activation string that contains connection information for the data call. For example, an activation string may contain an access point name (APN) for a UMTS profile or a dial string for a CDMA profile.

System selection is effectively performed in two parts. In the first part, the wireless user views access strings for available data services, selects the access string for the desired data service, and returns the selected access string. In the second part, the wireless device (or wireless user) selects a profile for a system most suited to provide the desired data service, from among all profiles associated with the selected access string. The first part is a trivial task for the wireless user, since the user only needs to identify and select the access string that best describes the desired data service. The wireless user does not need to have knowledge of the profiles provisioned on the wireless device or be aware of what purpose is served by each profile. The second part may be performed by the wireless device. This gives the wireless device flexibility to select the most suitable system for the desired data service from among all systems available for that data service. Better user experience and improved performance may thus be achieved using the system selection techniques described herein.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
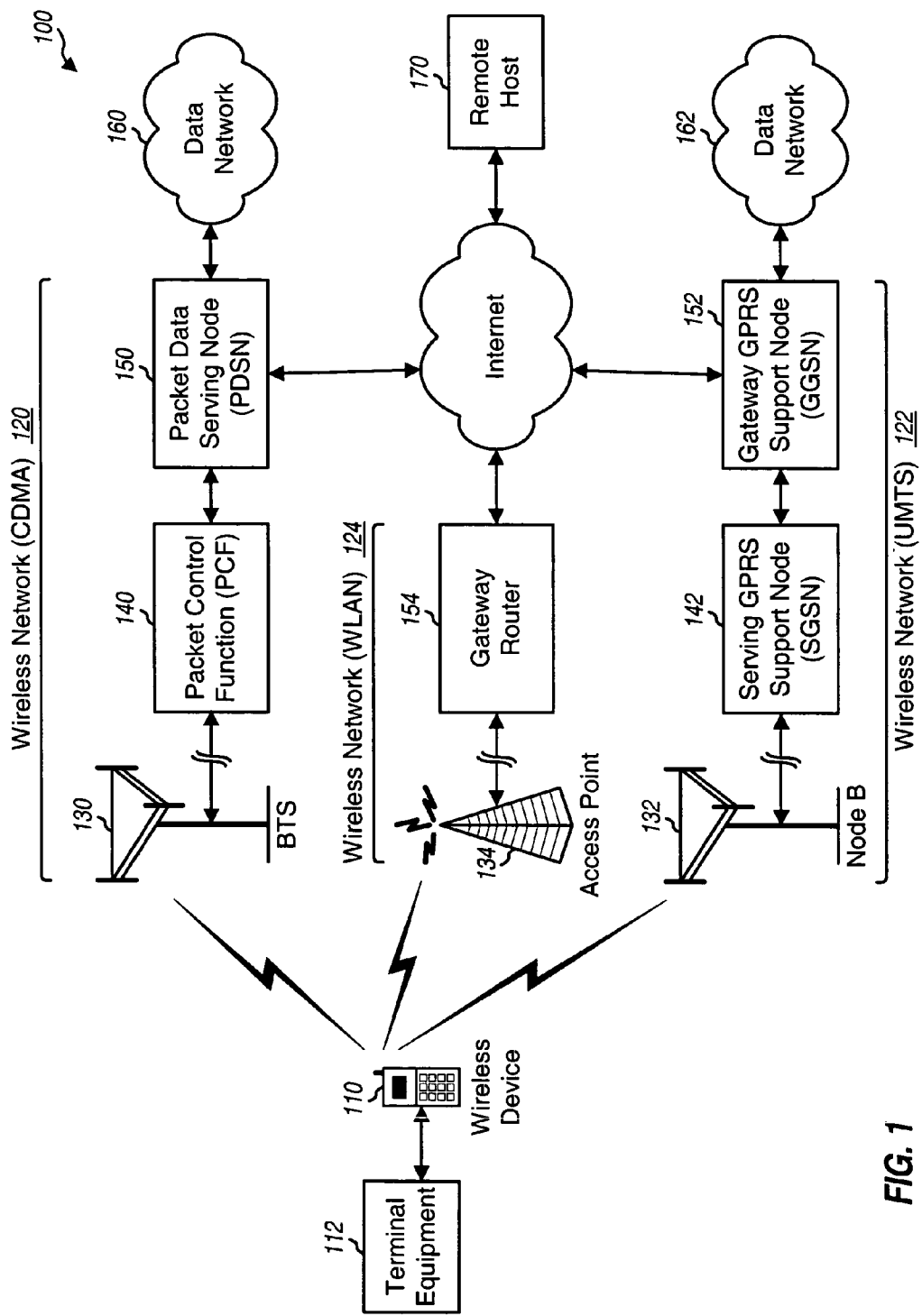
FIG. 1 shows a wireless multi-mode device capable of communicating with multiple wireless networks of different technologies.

FIG. 1 shows a deployment 100 in which a wireless multi-mode device 110 is capable of communicating with multiple wireless communication networks 120, 122, and 124 of different wireless network technologies. Wireless device 110 may be a cellular phone, a modem card, or some other wireless communication unit or device. Wireless device 110 may be referred to as a user equipment (UE), a mobile station (MS), a user terminal, and so on.

Wireless network 120 may be a CDMA network, e.g., a CDMA 1x, CDMA 1x EV-DO, CDMA 1x EV-DV, or IS-95 network. Wireless network 120 includes network entities described by 3GPP2. Wireless device 110 may communicate with a base transceiver station (BTS) 130 in wireless network 120 via an air-link connection. For data services, BTS 130 communicates with a Packet Control Function (PCF) 140, which further communicates with a Packet Data Serving Node (PDSN) 150. PCF 140 is a network entity that controls the transmission of packets between BTS 130 and PDSN 150 in wireless network 120. PDSN 150 supports data services for wireless devices in the CDMA network. For example, PDSN 150 is responsible for the establishment, maintenance, and termination of a PPP (Point-to-Point Protocol) session for the wireless devices. PDSN 150 may also assign dynamic Internet Protocol (IP) addresses to the wireless devices. PDSN 150 may couple to the Internet and/or other data networks (e.g., a data network 160) and can communicate with other entities (e.g., a remote host 170) that couple to these networks.

Wireless network 122 may be a UMTS network that may utilize W-CDMA or GSM for air interface and GPRS for the data network. Wireless device 110 may communicate with a Node B 132 in wireless network 122 via an air-link connection. For data services, Node B 132 communicates with a Serving GPRS Support Node (SGSN) 142, which further communicates with a Gateway GPRS Support Node (GGSN) 152. SGSN 142 controls the transmission of data packets between Node B 132 and GGSN 152. GGSN 152 supports data services for the wireless devices in the UMTS network and may couple to the Internet and/or other data networks (e.g., a data network 162).

Wireless network 124 may be a wireless local area network (WLAN) that provides communication coverage for a limited geographic area. For example, wireless network 124 may be (1) an IEEE 802.11 network that implements an IEEE 802.11 standard (e.g., 802.11a, b, g, and so on), (2) a Bluetooth personal area network (BTPAN) that employs Bluetooth wireless technology, or (3) some other type of WLAN that may employ some other network and wireless technologies. Wireless network 124 includes an access point 134 and a gateway router 154. Wireless device 110 may communicate with access point 134 via an air-link connection. Gateway router 154 supports data services for the wireless devices in the WLAN and couples to the Internet.

In general, wireless device 110 may be capable of communicating with any number of wireless networks of different wireless network technologies. Each wireless network may be a wireless wide area network (WWAN) (e.g., a CDMA or UMTS network) or a WLAN (e.g., an IEEE 802.11 network or a BTPAN). Three exemplary wireless networks for three different wireless network technologies (CDMA, UMTS, and WLAN) are shown in FIG. 1. The system selection techniques described herein may be used for various wireless networks. For clarity, these techniques are specifically described for a wireless device capable of communicating with CDMA and UMTS networks (e.g., wireless networks 120 and 122 in FIG. 1).

Wireless device 110 may operate in a standalone configuration or an attached configuration. In the standalone configuration, wireless device 110 is not coupled to a terminal equipment, and the wireless user uses the wireless device directly to obtain data services. In the attached configuration, wireless device 110 is coupled to a terminal equipment 112, the wireless user obtains data services via the terminal equipment, and the terminal equipment communicates with the wireless device to provide the data services. Terminal equipment 112 may be a laptop computer, a personal digital assistant (PDA), or some other electronic unit or device.

For both configurations, wireless device 110 provides over-the-air communication for a data call to obtain the desired data service. For the standalone configuration, wireless device 110 further supports end-to-end communication for the desired data service. For the attached configuration, terminal equipment 112 supports end-to-end communication for the desired data service. For example, wireless device 110 may perform processing for a link layer and a physical layer, which are the two lowest layers in the protocol stack for the data call. Terminal equipment 112 or wireless device 110 may implement a transport layer and a network layer (e.g., IP), which are the next two higher layers in the protocol stack.

The UMTS family utilizes Packet Data Protocol (PDP) contexts to support data connectivity. A UMTS device may be provisioned with any number of PDP contexts. Each PDP context is assigned a unique context identifier (ID) and contains (1) parameters such as PDP type, access point name (APN), PDP address, and so on, and (2) parameters that are specific to the PDP type. The PDP type indicates the particular protocol to use for the data call, e.g., IP version 4 (IPv4), IP version 6 (IPv6), PPP, and so on. The APN is a string parameter for a logical name used to select a GGSN or an external packet data network for the data call. Different service providers may define the APN differently. For example, a service provider may define the APN to include (1) an Operator ID that identifies the service provider and (2) a Network ID that specifies routing information for the service provider. A service provider may also define the APN based on service (e.g., "mobileip.xyz.com", where "mobileip" denotes a service and "xyz" is the name of the service provider.) In general, the APN specifies a point of attachment for the wireless device.

Each PDP context defines a specific data call to be established using a wireless network of a specific service provider. Each PDP context is normally implicitly or explicitly coupled to a specific wireless network technology (e.g., GPRS/EDGE or W-CDMA). A wireless user can establish data connectivity by specifying the context ID for a selected PDP context. The wireless user can also establish data connectivity by specifying an APN string itself. PDP context is described in detail in a document 3GPP TS 27.007, entitled "Technical Specification Group Terminals; AT command set for User Equipment (UE)," which is publicly available.

The CDMA family can utilize several different means to support data connectivity. Some of the means to indicate to the wireless device what services are required include dial strings, provisioned configurations, and user interface menu selections. The dial strings allows a wireless user to dynamically select the type of data call. The provisioned configurations are set up, e.g., during service activation, and each provisioned configuration tells the wireless device what type of call to make. The user interface menu selections are also set up on the wireless device such that each menu selection tells the device what type of call to make. The wireless device is implemented such that the dial strings, provisioned configurations, and/or user interface menu selections can direct the device to establish specific types of data call for specific services. For simplicity, the use of dial strings for CDMA is described below. A CDMA device may be provisioned with any number of dial strings. Each dial string defines a specific type of data call to be established.

Each PDP context and dial string normally contains pertinent information to establish a data call for a particular data service via a wireless network of a particular wireless network technology operated by a particular service provider. For the conventional usage model, the wireless user selects the proper PDP context/dial string for the desired data service from among all PDP contexts/dial strings provisioned on the wireless device. This conventional usage model has several disadvantages, especially for a multi-mode device capable of communicating with multiple types of wireless networks and obtaining a multitude of data services. First, the conventional usage model burdens the wireless user with having to make a decision for the most appropriate context/dial string for the desired data service. The wireless user would need to be aware of which data service may be obtained with each context/dial string, which wireless networks are accessible at the current time and location, which data services are available from these accessible networks, and so on. This can complicate data usage for the wireless user. Second, the conventional usage model does not allow for flexibility to select the best available wireless network to obtain the desire data service. This inflexibility stems from each profile being implicitly or explicitly associated with a specific combination of data service, wireless network technology, and service provider.

The system selection techniques described herein can overcome the disadvantages noted above. The system selection techniques utilize the innovative usage model, which can simplify system selection for the wireless device. The techniques select the system that is most suitable to provide the desired data service to the wireless user using the wireless device.

Figure 2A:
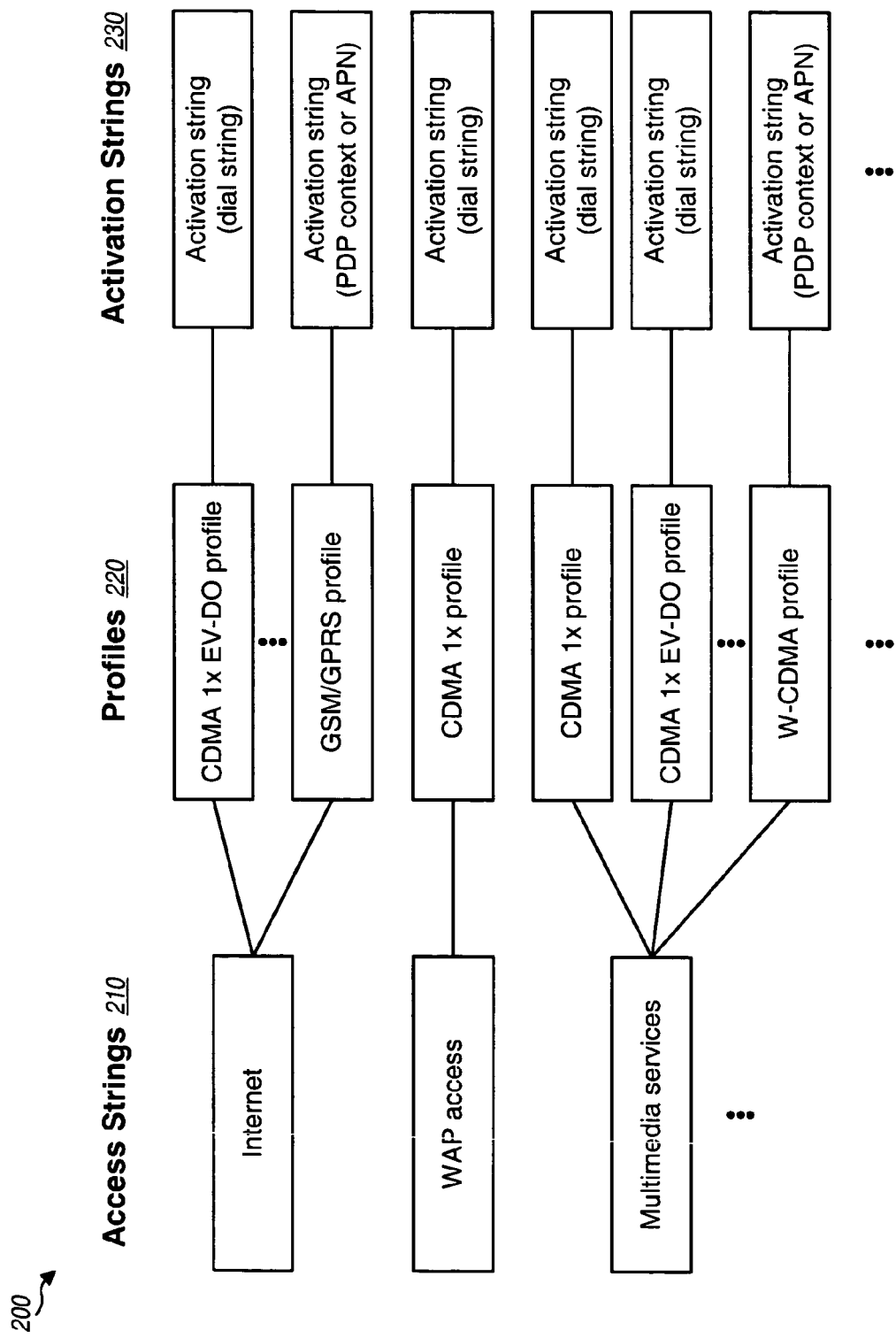
FIG. 2A illustrates the innovative usage model for system selection.

FIG. 2A illustrates innovative usage model 200 used for system selection. A wireless device may be provisioned with any number of access strings 210. Each access string is for a particular wireless data service. For example, the wireless device may be provisioned with access strings for Internet, WAP access (for WAP server access), multimedia services, position determination (e.g., based on GPS and/or cellular signals), broadcast services (e.g., for broadcast media over IP), and so on. An access string may be defined generally (e.g., "Internet") or with specificity (e.g., "high-speed Internet," "dial-up Internet," or "Internet in home network"). The access strings may be formed, for example, by abstracting out data services in PDP contexts, APNs, and dial strings. Each access string may further be associated with a pneumonic label that is descriptive of the associated data service and which may be easily recognized by the wireless user.

Each access string 210 is further associated with one or more profiles 220. Each profile is for a specific system (i.e., a specific Technology and Provider pair) and includes one or more parameters usable to establish a data call. For example, a profile may include parameters for subscriber information, security information, authentication information, service options (for the CDMA family), grade of service (GoS), quality of service (QoS), protocol information (e.g., simple IP or mobileIP), compression information, domain name system (DNS) information, call control information, and so on, or a combination thereof. A profile for a system in the UMTS family (i.e., a UMTS profile) may include all of the parameters in a PDP context. A profile for a system in the CDMA family (i.e., a CDMA profile) may include all of the pertinent parameters for that system, which may be dependent on implementation. Although not shown in FIG. 2A for simplicity, an access string may be associated with multiple profiles for the same wireless network technology, with each profile providing a different data connection using that technology.

Each profile is further associated with an activation string 230 that contains connection information. Each profile may be viewed as containing one or more parameters, and the activation string is then one of the profile parameters. Each activation string includes a set of one or more data access parameters that defines a specific data connection and is used by the wireless device to make a certain type of data call. For example, an activation string for a UMTS profile may be set to an APN. An activation string for a CDMA profile is dependent on the specific implementation of the wireless device. The parameters for an activation string for a CDMA profile may include, for example, a parameter indicating a circuit-switched or packet-switched call, a parameter indicating a particular radio access technology to use for the call, and so on, or any combination thereof. Each profile may be activated using the associated activation string to obtain data connectivity over a wireless network of the wireless network technology and operated by the service provider associated with the profile.

The profiles associated with each access string define all of the different systems (i.e., wireless network technologies and service providers) capable of providing the data service identified by that access string. There may be a one-to-many mapping from access strings to profiles. There is a one-to-one mapping from profiles to access strings. There is also a one-to-one mapping between profiles and activation strings.

Figure 2B:
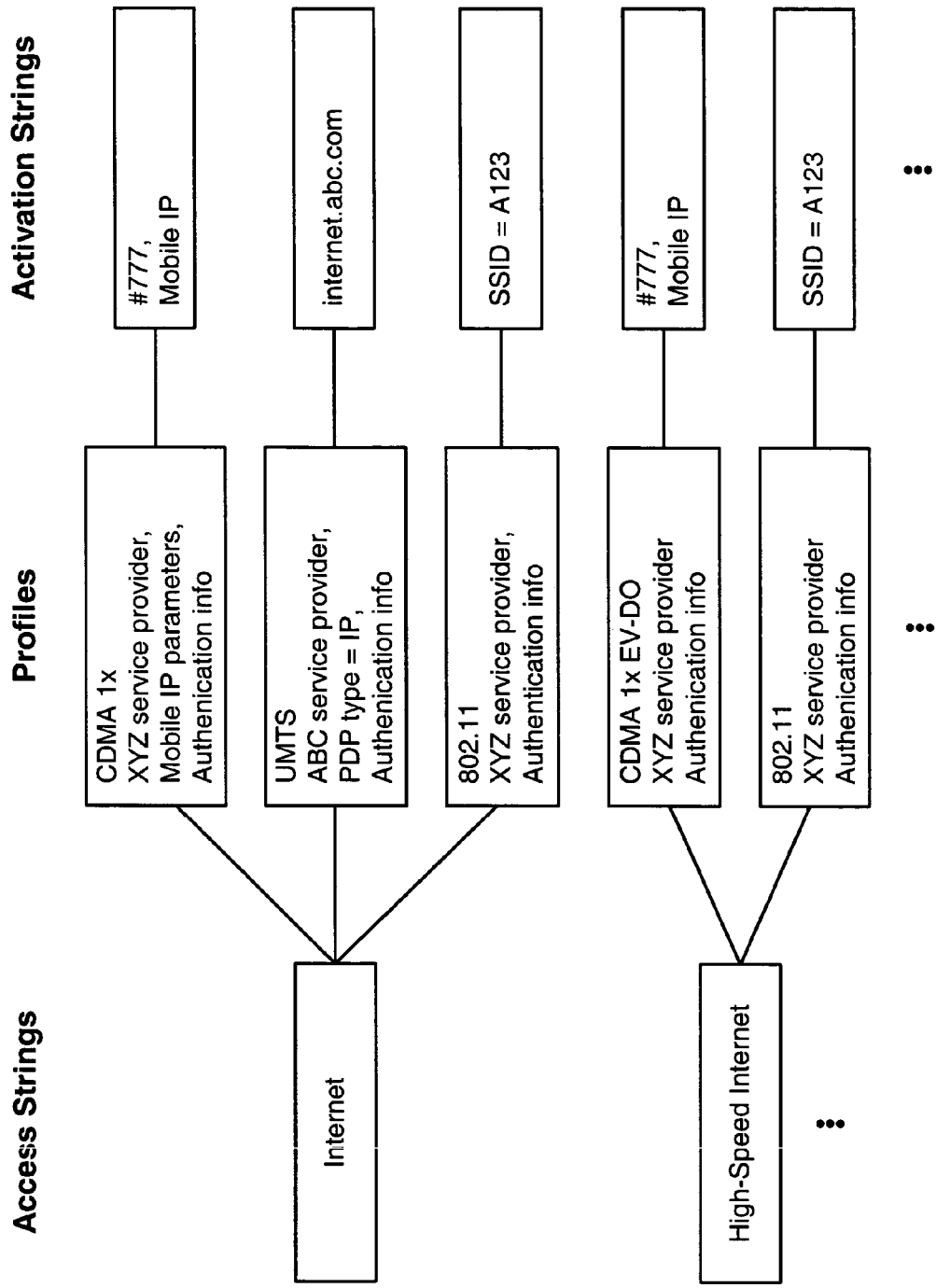
FIG. 2B shows an example of access strings, profiles, and activation strings.

FIG. 2B shows an example of access strings, profiles, and activation strings that may be provisioned on a wireless device. In this example, the "Internet" access string is associated with three profiles for CDMA 1×, UMTS, and 802.11. The profile for CDMA 1× includes the service provider name ("XYZ"), mobile IP parameters (e.g., home agent and foreign agent), and authentication information. This profile is associated with an activation string having a dial string of "#777, Mobile IP", which is understood by the hardware within the wireless device to mean a packet data call for mobile IP. The profile for UMTS includes the service provider name ("ABC"), PDP type (IP), and authentication information. This profile is associated with an activation string having an APN of "internet.abc.com". The profile for 802.11 includes the service provider name ("XYZ") and authentication information. This profile is associated with an activation string having a service set identifier (SSID) of "A123", which identifies the components of the 802.11 network operated by the "XYZ" service provider.

In the example shown in FIG. 2B, the "high-speed Internet" access string is associated with two profiles for CDMA 1× EV-DO and 802.11. The profile for CDMA 1× EV-DO includes the service provider name ("XYZ") and authentication information. This profile is associated with an activation string having a dial string of "#777, Mobile IP". The profile and activation string for 802.11 are the same as described above for the "Internet" access string.

The access strings, profiles, and activation strings may be provisioned on the wireless device at the time of service activation, e.g., by a representative of the service provider. The access strings, profiles, and activation strings may also be provisioned, modified, and/or deleted via over-the-air signaling. This may be achieved, for example, in a manner similar to that performed for PDP contexts in UMTS and described in 3GPP TS 27.007.

Access strings, profiles, and activation strings may also be created by the wireless user. The wireless user may define an access string for a desired data service, create one or more profiles and activation strings for the access string, and associate the profile(s) with the access string. The wireless user would need to have knowledge of what activation strings may be used to obtain the data service described by the access string that has been created. The wireless user would also be responsible for supplying other parameters needed for each profile and activation string.

The wireless user may also define the access strings, profiles, and activation strings such that specific data services are obtained from specific systems. For example, the wireless user may create an access string, a profile, and an activation string for a particular data service from a particular service provider using a particular wireless network technology. The access string is then associated with one profile and one activation string and is for a specific combination of Service, Technology, and Provider. If the activation string includes an APN, then the access string may be identified by this APN. In any case, this access string is associated with a single profile and wireless network technology (unlike an access string for a data service which may be associated with multiple profiles and multiple activation strings). If this access string is thereafter selected by the wireless user, then the wireless device establishes a data session using the single profile associated with this access string. Thus, a specific system (a specific Technology and Provider pair) is always used for this access string. This allows the wireless user to have tight control over system selection, in the same manner supported by many conventional wireless networks. However, this capability is provided as an option (instead of a requirement) for the innovative usage model, e.g., to support backward compatibility with wireless devices that employ the conventional usage model.

Figure 3:
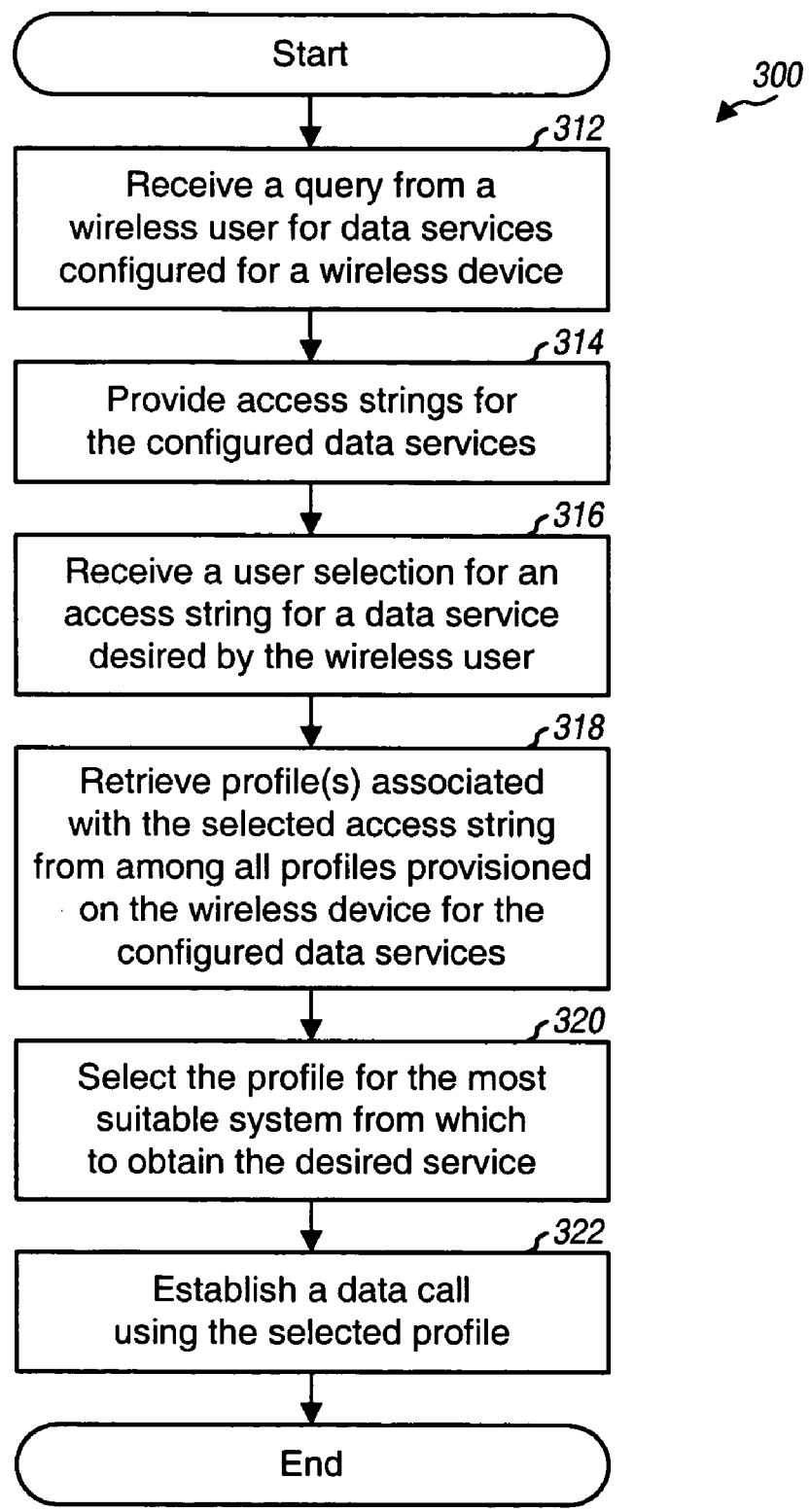
FIG. 3 shows a process for activating a data call by the wireless device for a standalone configuration.

FIG. 3 shows a flow diagram of a process 300 for activating a data call by the wireless device in the standalone configuration. Process 300 is based on the innovative usage model shown in FIG. 2A. The wireless user desiring to obtain a data service (e.g., "Internet") queries the wireless device for a list of all data services configured for the wireless device (block 312). In response, the wireless device returns access strings for the configured data services (block 314). This is different from a conventional wireless device that returns contexts/dial strings, since the access strings identify data services rather than specific connection information.

The wireless user may also query for "accessible" data services, which are data services that can be obtained from wireless networks currently accessible to the wireless device. In this case, the wireless device can return only access strings for the accessible data services. This option allows the wireless user to see only those access strings that the wireless device can activate with a high probability of success since the wireless networks providing these data services are currently accessible.

The wireless device may also return "preferred" access strings, which are access strings that meet one or more predetermined criteria. For example, the preferred access strings may be access strings for service providers identified as being preferred, access strings for wireless network technologies identified as being preferred, access strings that meet certain cost and performance criteria, and so on. The wireless device may also provide all access strings but tag the preferred or accessible access strings in a format and/or manner that can be recognized by the wireless user.

Since each access string identifies a data service, the access strings returned by the wireless device provide a highly intuitive user interface from which the wireless user can select the desired data service. The wireless user then selects an access string based on the desired data service (block 316). For example, if the wireless user desires to browse the Internet, then the user may select an access string labeled "Internet". The wireless device receives the selected access string and retrieves all profiles associated with selected access string from among all profiles provisioned on the wireless device for the configured data services (block 318). For the example above, in response to receiving the "Internet" access string, the wireless device may retrieve all UMTS profiles that are associated with APNs capable of providing Internet connectivity and all CDMA profiles associated with activation strings that are capable of providing Internet connectivity.

Each profile that is associated with the selected access string represents a different system that may be used to obtain the desired data service. The wireless device (or the wireless user) then selects the profile for the most suitable system from which to obtain the desired service (block 320). The system selection for the desired data service may be performed as described below and may be based on various criteria. The wireless device then uses the selected profile to establish a data call (block 322).

Figure 4:
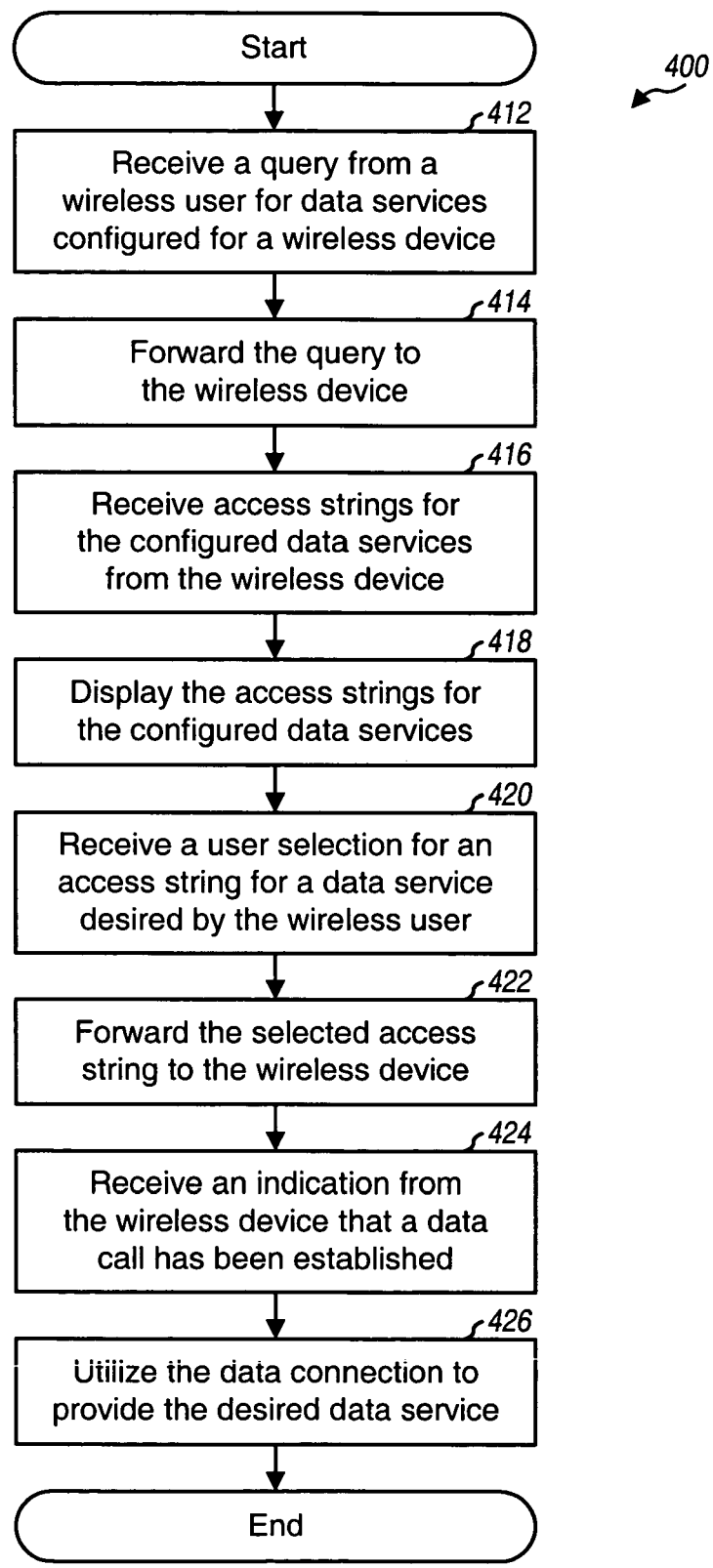
FIG. 4 shows a process for activating a data call by a terminal equipment for an attached configuration.

FIG. 4 shows a flow diagram of a process 400 for activating a data call by the terminal equipment in the attached configuration. Process 400 is also based on the innovative usage model shown in FIG. 2A. The wireless user queries the terminal equipment for a list of all data services configured for the wireless device (block 412). The terminal equipment forwards the query to the wireless device (block 414), receives access strings for the configured data services (block 416), and displays the access strings for the wireless user (block 418). Again, the wireless user may query for "accessible" data services instead of all data services.

The wireless user then selects an access string based on the desired data service. The terminal equipment receives the selected access string (block 420) and forwards it to the wireless device (block 422). The wireless device selects the profile for the system most suited to provide the desired data service identified by the selected access string, and activates the selected profile to establish a data call. The terminal equipment thereafter receives an indication that the data call has been established (block 424) and utilizes the data connection to provide the desired data service for the wireless user (block 426).

For processes 300 and 400, the wireless user does not need to have knowledge of the profiles or be aware of what purpose is served by each profile. The wireless user only needs to identify and select the access string that best describes the data service desired by the user. This is typically a trivial task for the wireless user. The intelligence and decision making for system selection may be pushed to the wireless device. This can provide better user experience. Moreover, the wireless device has flexibility to select the most suitable system from which to obtain the desired data service since it can select from among all profiles associated with the selected access string for the desired data service.

The system selection is thus effectively performed in two parts. In the first part, the wireless user selects the desired data service and returns the selected access string. In the second part, the wireless device selects the profile for the most suitable system among all profiles associated with the selected access string. The second part of the system selection may be performed based on various criteria. For example, the wireless user may define a list of preferred service providers and/or a list of preferred wireless network technologies. In this case, the wireless device may select the profile with the highest ranked service provider and/or highest ranked technology. The system selection may also be based on cost, performance, and so on. For example, the system with the lowest cost for data connection may be selected, or the system with the highest data rate, strongest received signal strength, and/or best quality of service may be selected.

The second part of the system selection may also be based on an algorithm that implements a set of rules and evaluates a set of criteria to select the best system. For example, the wireless user may desire to select (1) the system with the best performance when under the coverage of wireless networks operated by service providers with which the user has service subscriptions and (2) the system with the lowest cost when roaming.

The second part of the system selection may be performed by (1) the wireless device autonomously without any inputs from the wireless user, (2) the wireless device with inputs from the wireless user, or (3) the wireless user. For example, the wireless user may desire to (1) perform the system selection when not roaming and (2) have the wireless device performs system selection autonomously when roaming. The wireless user may also provide user preference for various criteria (e.g., service provider, technology, cost, performance, and so on) that may be evaluated for system selection. The second part of the system selection may thus be performed in numerous manners, and this is within the scope of the invention.

A wireless device typically performs two procedures, registration/attachment and activation, in order to establish data connection with a wireless network. The wireless device performs registration/attachment to make itself known to the wireless network. Upon completing the registration/attachment, the wireless network is able to track the wireless device (via subsequent location updates) and is also aware of the capabilities of the wireless device and the services and wireless networks accessible to the wireless device. The wireless device may thereafter camp on a cell in the wireless network if there is no activity. The wireless device performs activation to establish data connection. Upon completing the activation, a virtual connection is established between the wireless device and the network entity (e.g., PDSN or GGSN) that is the interconnection point in the wireless network for external data networks.

Registration may be performed using a manual mode or an automatic mode. The manual registration mode allows the wireless user to select a specific service provider to camp on. For this mode, the wireless device searches for a wireless network operated by the selected service provider. Alternatively, the wireless user may provide a list of preferred service providers, and the wireless device would then search for wireless networks to register based on the service provider preference. The preferred list may be stored in the wireless device. For the automatic registration mode, the wireless device searches for the best possible wireless network, based on a policy that is pre-provisioned on the wireless device and without any user intervention, and then registers with this wireless network.

The innovative usage model described herein supports both registration modes. To support the manual registration mode, when queried by the wireless user, the wireless network may return either (1) only "preferred" access strings, which may be access strings associated with profiles for service providers on the preferred list, or (2) all access strings but identify or tag the preferred access strings such that the wireless user can easily differentiate them from the non-preferred access strings. The second option provides the wireless user with more flexibility since the user can see all access strings but may choose to select one of the tagged access strings. Since the access strings are normally defined for data services, a preferred access string may be associated with profiles for service providers on the preferred list as well as service providers not on the preferred list. In this case, for the second part of system selection, the wireless device may retrieve all profiles associated with the selected access string, discard profiles for service providers not on the preferred list, and select one of the remaining profiles for a service provider on the preferred list. The use of the access strings in combination with the preferred list allows the wireless user to choose data services provided by specific service providers.

The preferred access strings may also be defined in other manners. For example, the preferred access strings may be for preferred wireless network technologies, for systems currently accessible by the wireless device, for systems that meet a set of criteria (e.g., cost and performance), and so on.

To support the automatic registration mode, the wireless device may first identify access strings associated with profiles that conform to the pre-provisioned policy. The second part of system selection may then be performed in similar manner as described above for the manual registration mode.

Figure 5:
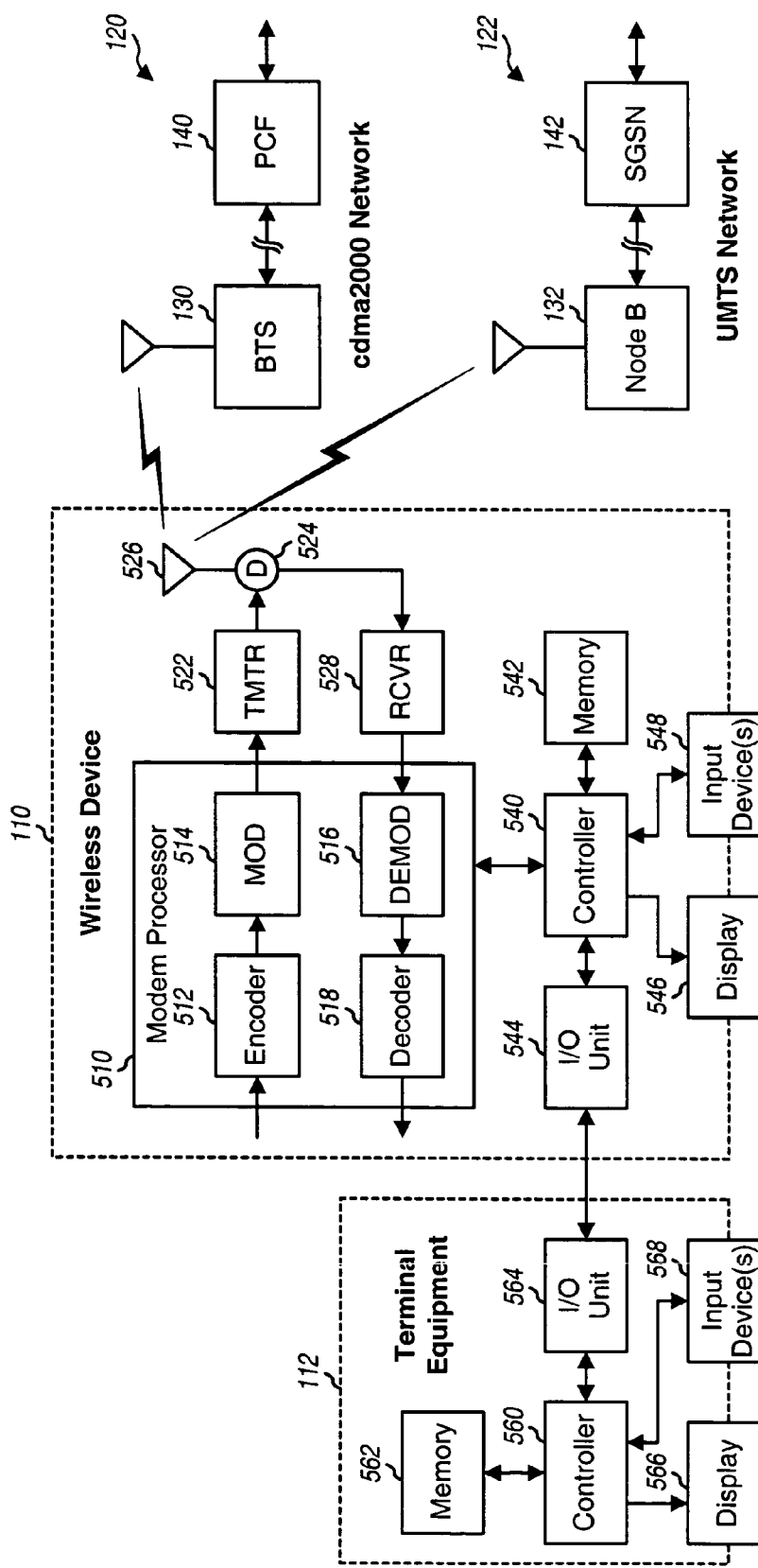
FIG. 5 shows a block diagram of the wireless device and terminal equipment.

FIG. 5 shows a block diagram of wireless device 110. On the transmit path, data and signaling to be sent by the wireless device are processed (e.g., formatted, encoded, and interleaved) by an encoder 512 and further processed (e.g., modulated, spread/channelized, and scrambled) by a modulator (MOD) 514 to obtain a stream of data chips. A transmitter unit (TMTR) 522 then conditions (e.g., converts to analog, filters, amplifies, and frequency upconverts) the data chip stream to generate a downlink modulated signal, which is routed through a duplexer (D) 524 and transmitted via a antenna 526.

On the receive path, uplink signals transmitted by the base stations in wireless networks (e.g., CDMA network 120 and UMTS network 122) are received by antenna 526, routed through duplexer 524, and provided to a receiver unit (RCVR) 528. Receiver unit 528 conditions (e.g., filters, amplifies, and frequency downconverts) the received signal and further digitizes the conditioned signal to obtain data samples. A demodulator (Demod) 516 processes (e.g., descrambles, despeads/channelizes, and data demodulates) the samples to obtain symbols. A decoder 518 further processes (e.g., deinterleaves and decodes) the symbols to obtain decoded data.

Encoder 512, modulator 514, demodulator 516, and decoder 518 are processing units for a modem processor 510. These units perform processing in accordance with the wireless network technology (e.g., W-CDMA or IS-2000) for which data connection is established.

A controller 540 directs the operation of the various units within wireless device 110. Controller 540 also implements process 300 shown in FIG. 3 for the standalone configuration. A memory unit 542 stores program code and data used by controller 540 and other units. An input/output (I/O) unit 544 provides an interface to terminal equipment 112. A display unit 546 displays information (e.g., access strings) for the wireless user. Input device(s) 548 (e.g., a keypad) receive inputs from the wireless user and provide the user inputs (e.g., for the selected access string) to controller 540.

FIG. 5 also shows a simplified block diagram of terminal equipment 112. A controller 560 performs processing for the terminal equipment and further directs the operation of various units within the terminal equipment. Controller 560 also implements process 400 shown in FIG. 4 for the attached configuration. A memory unit 562 stores program code and data used by controller 560. An I/O unit 564 provides an interface to wireless device 110. A display unit 566 displays information for the wireless user. Input device(s) 568 receive inputs from the wireless user and provide the user inputs to controller 560.

The wireless user may initiate wireless data services, e.g., as shown in FIGS. 3 and 4. The innovative usage model described herein can also support automatic initiation of wireless data services by higher layer applications. For example, a media player application may select a data service that is defined by an access string "Multimedia Streaming." The wireless device receives this selection, retrieves a profile associated with the selected access string, and activates the profile to establish a data session that supports multimedia streaming using multicast or broadcast. To ensure that the higher layer applications can obtain the desired data services, the access strings selectable by these applications may be standardized so that each standardized access string is for a specific defined data service. All applications can then know for certain what data services are provided by which standardized access strings.

The system selection techniques described herein employ an innovative usage model that makes it convenient for the wireless user to obtain wireless data services using the wireless device. These techniques are especially advantageous when the wireless user is roaming through different wireless networks operated by different service providers.

The system selection techniques described herein may be used for wireless networks of various technologies such as CDMA and UMTS families of technologies, 802.11, Bluetooth, and so on. These techniques may also be used for other existing and future wireless network technologies. In general, the system selection techniques may be used for a single-mode wireless device that supports a single wireless network technology and a multi-mode wireless device that supports multiple wireless network technologies.

The system selection techniques described herein may be implemented by various means. For example, these techniques may be implemented in hardware, software, or a combination thereof. For a hardware implementation, the processing units used to support system selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the system selection techniques may be implemented with modules (e.g., procedures, functions, and so on) that perform the functions described herein. The software codes may be stored in a memory unit (e.g., memory unit 542 or 562 in FIG. 5) and executed by a processor (e.g., controller 540 or 560). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device operable to obtain wireless data services, comprising:
    a controller operative to
        receive a query for data services configured for the wireless device,
        provide access strings provisioned on the wireless device for the configured data services, each access string being defined for a particular data service,
        receive a user selection for an access string for a desired data service,
        select a profile from along at least one profile associated with the selected access string, each of the at least one profile including information for establishing a particular data call for the desired data service identified by the selected access string, and
        establish a data call using the selected profile; and
    a memory unit operative to store the provisioned access strings and profiles associated with the provisioned access strings.

2. The wireless device of claim 1, wherein each of the provisioned access strings is associated with at least one profile.

3. The wireless device of claim 1, wherein each of the at least one profile is for a system of a specific wireless network technology and a specific service provider.

4. The wireless device of claim 1, wherein each profile includes one or more parameters usable to establish a data call.

5. The wireless device of claim 4, wherein the one or more parameters are for quality of service (QoS), security information, authentication information, domain name system (DNS) information, compression information, protocol information, call control information, or a combination thereof.

6. The wireless device of claim 1, wherein each of the at least one profile is further associated with an activation string containing information to connect a data call.

7. The wireless device of claim 6, wherein the activation string associated with the selected profile is an access point name (APN) identifying a point of attachment for a wireless communication network.

8. The wireless device of claim 6, wherein the activation string associated with the selected profile corresponds to a set of one or more parameters used by the wireless device to make a call in a Code Division Multiple Access (CDMA) system.

9. The wireless device of claim 8, wherein the set of one or more parameters for the activation string includes a parameter indicating a circuit-switched or packet-switched call.

10. The wireless device of claim 1, wherein at least one of the provisioned access strings is identified by an access point name (APN).

11. The wireless device of claim 1, wherein the controller is operative to select the profile for a system most suited for the desired data service from among the at least one profile associated with the selected access string.

12. The wireless device of claim 11, wherein the controller is operative to determine the most suitable system based on a list of preferred service providers.

13. The wireless device of claim 11, wherein the controller is operative to determine the most suitable system based on a list of preferred wireless network technologies supported by the wireless device.

14. The wireless device of claim 11, wherein the controller is operative to determine the most suitable system based on cost and performance criteria.

15. The wireless device of claim 1, wherein the controller is further operative to identify preferred access strings among the provisioned access strings, each preferred access string meeting one or more predetermined criteria.

16. The wireless device of claim 15, wherein the preferred access strings are for data services currently accessible by the wireless device.

17. The wireless device of claim 15, wherein the preferred access strings are for service providers identified as being preferred.

18. The wireless device of claim 15, wherein the preferred access strings are for wireless network technologies identified as being preferred.

19. The wireless device of claim 15, wherein the controller is operative to provide the preferred access strings in a user recognizable format.

20. The wireless device of claim 15, wherein the controller is operative to provide only the preferred access strings.

21. The wireless device of claim 1, further comprising:
    a modem processor operative to perform processing for the established data call.

22. The wireless device of claim 21, wherein the modem processor is operative to perform processing for a plurality of wireless network technologies.

23. The wireless device of claim 22, wherein the plurality of wireless network technologies include Wideband Code Division Multiple Access (W-CDMA) and IS-2000.

24. The wireless device of claim 22, wherein the plurality of wireless network technologies include Wideband Code Division Multiple Access (W-CDMA), GSM/GPRS, GSM/EDGE, or a combination thereof.

25. The wireless device of claim 22, wherein the plurality of wireless network technologies include IS-2000, IS-856, IS-95, or a combination thereof.

26. The wireless device of claim 22, wherein the plurality of wireless network technologies include a wireless local area network (WLAN) technology.

27. A method of obtaining wireless data services via a wireless device, comprising:
    receiving a query for data services configured for the wireless device;

providing access strings provisioned on the wireless device for the configured data services, each access string being defined for a particular data service;

receiving a user selection for an access string for a desired data service;

selecting a profile from along at least one profile associated with the selected access string, each of the at least one profile including information for establishing a particular data call for the desired data service identified by the selected access string; and establishing a data call using the selected profile.

28. A wireless apparatus operable to obtain wireless data services, comprising:

means for receiving a query for data services configured for the wireless apparatus;

means for providing access strings provisioned on the wireless apparatus for the configured data services, each access string being defined for a particular data service;

means for receiving a user selection for an access string for a desired data service;

means for selecting a profile from along at least one profile associated with the selected access string, each of the at least one profile including information for establishing a particular data call for the desired data service identified by the selected access string; and means for establishing a data call using the selected profile.

29. A processor readable media for storing instructions operable to:

receive a query for data services configured for the wireless device;

forward the query to the wireless device;

receive, from the wireless device, access strings for the configured data services, each access string being defined for a particular data service;

provide the access strings for display;

receive a user selection for an access string for a desired data service; and forward the selected access string to the wireless device, and wherein at least one profile is associated with the selected access string, each of the at least one profile including information for establishing a particular data call for the desired data service identified by the selected access string, and wherein one profile is selected from among the at least one profile and used to establish a data call for the desired data service.

30. The processor readable media of claim 29, wherein the wireless device is operable to establish data calls with wireless communication networks of a plurality of wireless network technologies.

* * * * *